United States Patent [19]

Silva

[11] Patent Number: 5,358,283
[45] Date of Patent: Oct. 25, 1994

[54] SPLIT CONNECTOR PIPE JOINING DEVICE AND METHOD

[76] Inventor: Lawrence S. Silva, 153 E. Falmouth Hwy., E. Falmouth, Mass. 02536

[21] Appl. No.: 78,921

[22] Filed: Jun. 21, 1993

[51] Int. Cl.⁵ .............................................. F16L 35/00
[52] U.S. Cl. .................................. 285/24; 285/373; 285/383; 285/423; 285/915
[58] Field of Search ............... 285/373, 419, 421, 24, 285/383, 423

[56] References Cited

U.S. PATENT DOCUMENTS

| | | |
|---|---|---|
| 1,283,554 | 11/1918 | Pillig . |
| 3,041,088 | 6/1962 | Brandon, Jr. . |
| 3,069,189 | 12/1962 | Hollaender ............... 285/419 X |
| 3,224,795 | 12/1965 | Conley . |
| 3,229,998 | 1/1966 | Pennington ................. 285/419 |
| 3,352,575 | 11/1967 | Daspit . |
| 3,771,820 | 11/1973 | Hoss et al. ................. 285/373 |
| 4,095,826 | 6/1978 | Borradori . |
| 4,109,944 | 8/1978 | Curtin ....................... 285/421 X |
| 4,159,132 | 6/1979 | Hitz . |
| 4,236,736 | 10/1980 | Anderson . |
| 4,374,596 | 2/1983 | Schlemmer et al. ......... 285/419 X |
| 4,615,161 | 10/1986 | Mileham . |
| 5,098,134 | 3/1992 | Monckton ................... 285/419 X |
| 5,152,556 | 10/1992 | Holland et al. . |

FOREIGN PATENT DOCUMENTS

| | | | |
|---|---|---|---|
| 2037950 | 2/1972 | Fed. Rep. of Germany ...... 285/373 |
| 2429121 | 1/1976 | Fed. Rep. of Germany ...... 285/373 |
| 774641 | 12/1934 | France ............................ 285/419 |

Primary Examiner—Dave W. Arola

[57] ABSTRACT

A split connector for joining pipe elements insitu including a first pipe element and a second pipe element positioned in a structure, a pair of matched semi circular body elements of semicircular construction adapted for forming a generally circular coupling connector having a cylindrical body and including an internal facing surface divided at the mid point, the first half adapted to engage a tubular end of the first pipe element and the second half adapted to engage the second pipe element, having wedge, members for connecting the first body element to the second body element and a pair of female grooves on the second half cylinder for forming a unitary axially-split collar having water tight seams; and including an internal shoulder capable of engaging a lug the first pipe section with fastening provided by adhesive applied to the pipe ends and the facing surfaces of the split connectors for providing a watertight seal and structural strength of the piping components; wherein the pair of matched semi circular body elements are placed over the end of the first pipe section and the end of the second pipe section and positioned with a mid ridge positioned between the enclosed end of the first pipe and the enclosed end of second pipe section and fastened thereto with sealing means.

5 Claims, 2 Drawing Sheets

SPLIT CONNECTOR PIPE JOINING DEVICE AND METHOD

DESCRIPTION

BACKGROUND OF THE INVENTION

The present invention relates to a connector for joining two tubes, typically pipe sections constructed of plastic, such as PVC, and more particularly to a method for enabling repair of tubing elements insitu in piping systems installed in a building structure. In particular the invention relates to modifying piping systems or repairing said piping systems characterized by low pressure plumbing joints between adjacent open ended tubes constructed of PVC material adapted for use in indoor plumbing systems.

It is recognized that repair requiring joining of butt-ends, and open ended tubing of piping insitu is difficult because, in order to gain adequate access to effect a repair, typically a substantial section of adjacent molding and wall paneling must be removed, thereby inflicting damage on the structure, typically walls of a room. The repair generally involves removing a section of piping, for making a new joint for replacement thereof due to damaged or leaky joint and manipulating a length of pipe, or alternatively to make changes in the piping system for adding or deleting pipe or changing the configuration thereof.

Applicant is aware of other prior art devices which provide for connectors for joining butting tubing elements. One such prior art device is U.S. Pat. No. 5,152,556 to Holland et. al, dated Nov. 6, 1992. Other prior art devices disclosing actually split connecting structures are disclosed in U.S. Pat. Nos. 4,236,736; 4,095,826; 3,352,575 and 1,283,554. The structure of U.S. Pat. No. 4,095,826 is particularly intended for joining rigid plastic pipe. U.S. Pat. Nos. 4,615,161; 4,266,164; 4,159,132; 3,224,795; and 3,041,088, describe other systems for joining open-end tubes together.

The formation of butt-joints in open-ended tubing is problematic, particularly when the joint is installed is not readily accessible i.e. being out in the open. Problems are exacerbated when the tubing is formed from materials which have a relatively low thread (shear) strength, such as plastic, ceramic, and/or carbon-carbon composites, which makes the formation of conventional threaded connections impractical. While compressible seals, such as 0-ring seals, can be utilized to improve the sealing characteristics of such a joint, composite materials are frequently not sufficiently strong to provide the desired compression of the seal ring when using conventional threaded end connectors.

It would therefore be desirable to provide connector designs, systems, and methods suitable for joining open-ended PVC tubing and pipes together when installed insitu buildings. The connectors should be relatively simple to manufacture and to put in place, and should be suitable for fabrication from most or all types of materials, including PVC. The connectors should include a include a seal element between the tubes being joined and should be able to provide sufficient compressive force to form an effective seal, even against water temperatures and pressure and the ranges of 80–100 PSI. Preferably, the connectors should provide both axial and radial compression of the seal to provide for joining of the PVC separate tubing elements.

SUMMARY OF THE INVENTION

The present invention relates generally to a split connector for joining butting tubing elements insitu, more particularly to a system for forming joints between adjacent open-ended tubes, particularly tubes formed from PVC materials.

The present invention provides a connector system suitable for joining a first pipe end to a second pipe end. The first pipe section includes an end section and a sealing surface adapted to fit between two halves of the split connector adapted to receive a pipe end coated with adhesive. The two halves of the split connector are axially compressed around the first pipe end and the second pipe end as the two halves are drawn together. The adhesive used to coat the pipe ends is simultaneously radially compressed in order to enhance the strength of the seal and adding strength to the other components of the connector system.

In particular the preferred embodiment includes a split connecting device for repairing piping systems insitu having a reference end and first half section and a second half section configured with a first pipe segment installed in a structural element, typically a wall and a second pipe element installed in a structural element aligned for connection with the first pipe segment. The first half-section includes a male half-cylinder constructed of PVC material including a transverse mid-ridge positioned at the mid-point of said male half-cylinder dividing said half-cylinder into two arcuate sections. The two arcuate sections are constructed with a pair of continuous ridges, each configured of dovetailed construction positioned on spaced-apart opposed longitudinal edges having wedge members extending along the entire longitudinal edges of the male half cylinder.

In this embodiment, the second half section consists of a female half cylinder constructed of PVC material including a transverse mid-ridge positioned at the mid-point of the female half cylinder dividing said half-cylinder into two arcuate sections adapted to cooperate with the two arcuate sections of the male half cylinders when joined together to provide a first chamber for receiving the distal end of the first pipe segment, the second chamber for accepting the distal end of the second pipe element. The female half cylinder includes and a pair of continuous grooves of angular configuration on each opposed , spaced apart longitudinal edge adapted to associate in locking engagement with the dovetail male wedge members of the male half cylinder. The continuous groves extend along the entire longitudinal edges of the female half cylinder.

Positioned on the reference end of the male half cylinder is a shoulder means for re-enforcement of the joining of the first half section to the second half section and for ease and alignment of the male half cylinder with the female half cylinder. Adhesive, typically clear PVC plastic pipe cement, is provided for fastening the male half cylinder to the female half cylinder by application to the distal ends of the first and second segments of pipe and to the interior surfaces of the first chamber of the split connecting device and to the second chamber of said split connecting device.

Connecting the first pipe element to the second pipe element is accomplished by joining the male half cylinder to the female half cylinder by engaging the female angular grooves with the double male wedge members to form a tubular split connecting device having a first cylindrical connecting chamber adapted for receiving the distal end of a first pipe segment and a second chamber for accepting the distal end of a second pipe segment such that said distal ends extend into the first and second chambers to abut the transverse mid-ridge of the first and second half section for providing a secure, water-tight connection of the first pipe element to the second pipe element.

In a preferred aspect of the present invention, apparatus for drawing the first connector half into engagement with the second connector half includes a pair of male wedges extending longitudinally along sides of the first half cylinder and a pair of associated female grooves on the second half cylinder for forming a unitary axially-split collar. The split collar, being longitudinally split on opposite sides includes an external shoulder on the reference end of one pipe element capable of engaging the lug of the other first pipe section. Excessive tightening of the tubes in the axial direction is not necessary since the adhesive, typically clear PVC plastic pipe cement is provided for providing a waterproof seal.

In a particularly preferred aspect, pipes and split collar will be formed from a single material, usually from a single composite material, more usually from PVC material.

The invention will be described for the purposes of illustration only in connection with certain embodiments; however, it is recognized that those persons skilled in the art may make various changes, modifications, improvements and additions on the illustrated embodiments all without departing from the spirit and scope of the invention.

DETAILED DESCRIPTION OF THE PREFERRED EMBODIMENT

Figure 1:
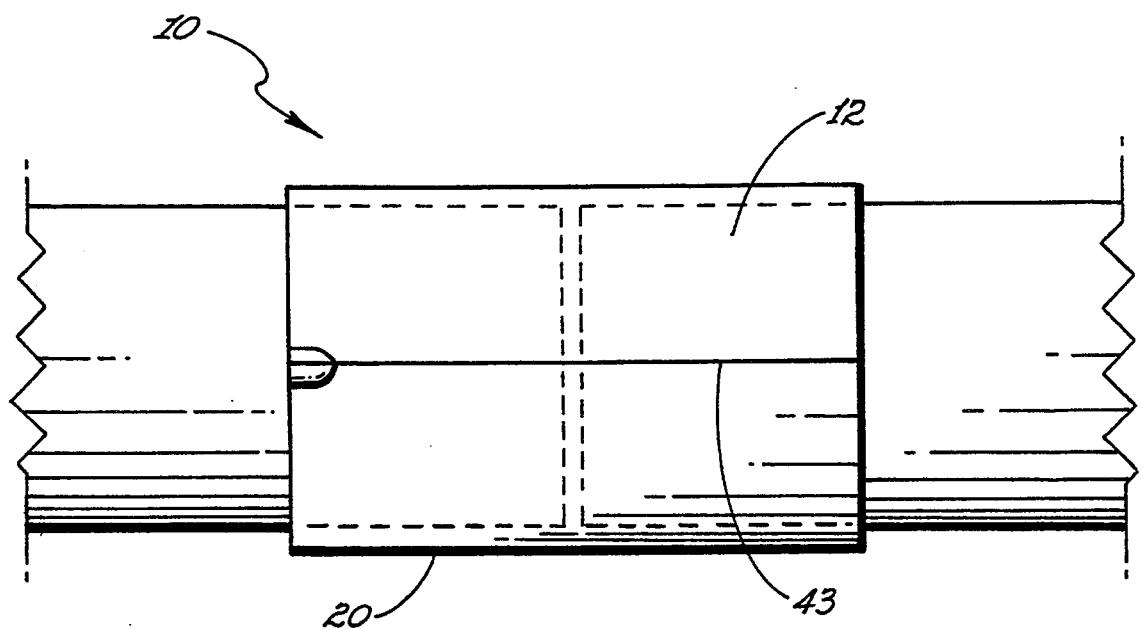
FIG. 1 is a side view of the present invention shown connecting two pipe ends.

Referring to the drawings, the split connector assembly 10 for joining pipe elements includes a split coupling 12 for connecting a first piping element 14 to a second pipe element 16. Said split coupling includes a pair of matched semicircular body elements 18 adapted for forming a generally circular coupling connector having a cylindrical body 20 and including a circular facing surface 22 divided at the mid point, 24, the first half adapted to engage a tubular end 26 of the first pipe element 14 the second half adapted to engage a tubular end 28 of the second pipe element 16.

Figure 3:
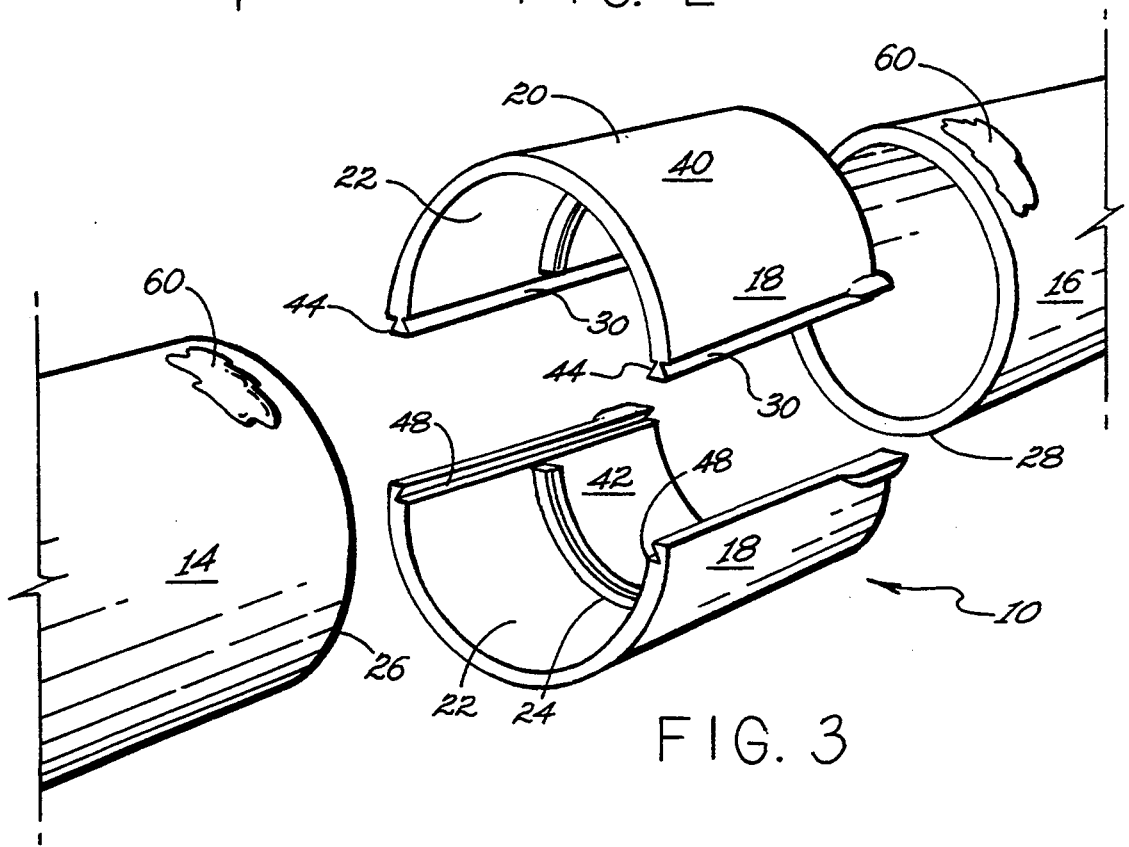
FIG. 3 is an exploded isometric view of a joint formed from the components illustrated in FIG. 1.
Figure 4:
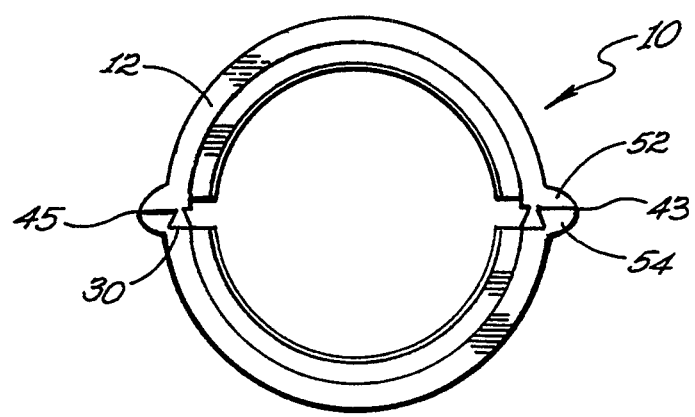
FIG. 4 is an end view of the invention of FIG. 1.

As is shown in FIG. 3, a wedge locking device 30 is provided for connecting the first body element 40 to the second body element 42 comprising double male wedges 44 extending longitudinally along sides of the first half cylinder 46 and a pair of associated female grooves 48 on the second half cylinder 50 for forming a unitary axially-split collar. The axially-split collar includes an internal shoulder 52 capable of engaging the lug 54, the first pipe section for providing structural reinforcement of the joining of the watertight seams 43 and 45.

The preferred embodiment includes a seal means for providing a watertight seal comprising adhesive 60 applied to the pipe ends 26 and 28 by coating facing surfaces 22 for providing a watertight seal and structural strength of the piping components; wherein the pair of matched semi circular body elements are placed over the end of the first pipe section and the end of the second pipe section and positioned with the mid-ridge positioned between the enclosed end of the first pipe and the enclosed end of second pipe section and fastened thereto with sealing means.

The wedge lock device 30 is constructed for applying an axial force tending to draw the first pipe end into alignment with the second pipe end abutting the mid-ridge 66.

The invention further includes a system for joining a first pipe end to a second pipe end insitu, wherein the means for applying an axial force against the retaining ring comprises means for applying an axial force against the retaining ring to draw the first pipe end into alignment with the second pipe end.

As is seen in FIGS. 1 & 3, the system includes the coupling connector comprises a cylindrical body and including a circular facing surface divided at the mid point by a mid ridge, the first half adapted to engage a tubular end of the first pipe element the second half adapted to engage a tubular end of the second pipe element.

Figure 2:
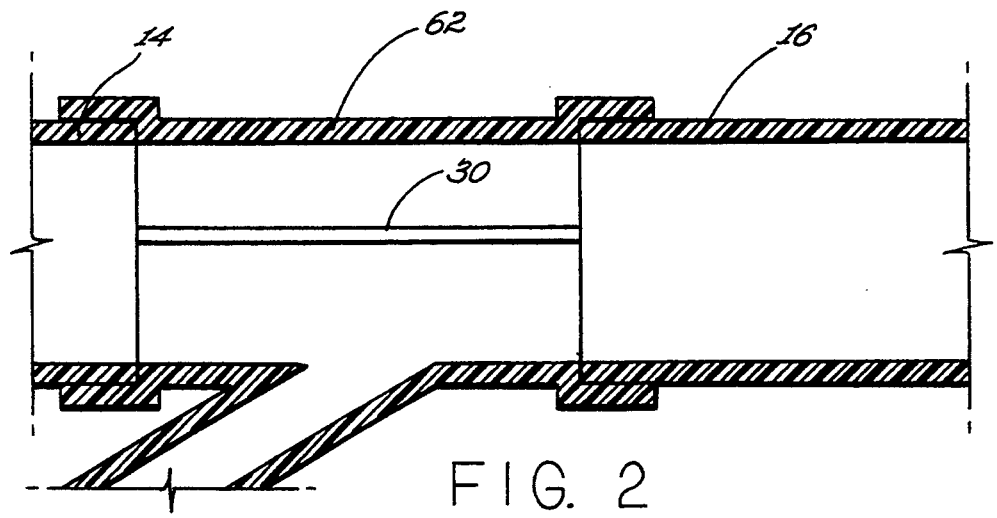
FIG. 2 is side view in section illustrating the various components of a preferred embodiment of the present invention.

As is shown in FIG. 2, an alternate embodiment incorporates a "Y" split connector 62.

What is claimed is:

1. A split connector for joining pipe elements insitu comprising:
    a) conduit means constructed of composite material comprising a first pipe element having a terminal end and a second pipe element having a terminal end wherein each of said first and second pipe elements are positioned insitu in a structure;
    b) split connector means constructed of like composite material for connecting the first pipe element to the second pipe element insitu comprising;
        i) a first half-section comprising a male half-cylinder having a first and second end and including a transverse mid-ridge positioned at the mid-point of said male half-cylinder dividing said half-cylinder into two arcuate sections;
        ii) a second half-section comprising a female half cylinder having a first and second end including a transverse mid-ridge positioned at the mid-point of the female half cylinder dividing said half-cylinder into two arcuate sections adapted to cooperate with the two arcuate sections of the male half cylinders when joined together to provide a first chamber for receiving the distal end of the first pipe segment and a second chamber for accepting the distal end of the second pipe element;
        iii) locking means of dovetailed construction for fastening the male half cylinder to the female half cylinder comprising a pair of continuous ridges on the male half cylinder positioned on spaced apart longitudinal edges having wedge members extending along the entire longitudinal edges of said male half cylinder adapted to associate with a pair of continuous grooves of angular configuration on the female half cylinder on each longitudinal edge for providing locking engagement of said male half cylinder with the female half cylinder for forming a generally circular coupling connector having a cylindrical body and including an internal facing surface divided at the mid point, the first half adapted to engage a tubular end of the first pipe element and the second half adapted to engage the second pipe element;

c) an external shoulder on the half section positioned at the first end thereof capable of engaging an associated lug on the second half section positioned at the first end of thereof for alignment of the split connector means; and d) seal means for providing a watertight seal comprising adhesive means applied to the terminal ends of the pipe ends and the facing surfaces of said split connector means including said internal facing surface of said first and second chambers of the split connector means for providing a watertight seal and structural strength of the piping components wherein the pair of matched semi circular body elements are placed over the end of the first pipe section and the end of the second pipe section with the mid ridge positioned between the enclosed end of the first pipe and the enclosed end of second pipe section and manually compressed together to engage the locking means fastened thereto with said adhesive means.

2. The split connector of claim 1, wherein the wedge members are tapered to provide a sliding fit so that the split connectors may be joined by sliding the first half section relative to the second half section to fully engage the wedge members in the continuous grooves.

3. The split connector of claim 1 wherein the adhesive means comprises clear PVC plastic pipe element.

4. The split connector of claim 1, wherein the locking means for connecting the first body element to the second body element comprise a pair of double male wedges extending longitudinally along sides of the first half cylinder and a pair of female grooves on the second half cylinder for forming a unitary axially-split collar joined to manual compression directing radially inward having water tight seams.

5. A split connecting device for repairing piping systems insitu having a first half section and a second half section comprising:

a) a first pipe segment installed in a structural element b) a second pipe element installed in a structural element aligned for connection with the first pipe segment;

c) the firs half-section comprises a male half-cylinder constructed of PVC material including a transverse mid-ridge positioned at the mid-point of said male half-cylinder dividing said half-cylinder into two arcuate sections constructed with a pair of continuous ridges each configured of dovetailed construction positioned on spaced apart longitudinal edges having dovetailed wedge members extending along the entire longitudinal edges of the male half cylinder;

d) the second half section comprises of a female half cylinder constructed of PVC material including a transverse mid-ridge positioned at the mid-point of the female half cylinder dividing said half-cylinder into two arcuate sections adapted to cooperate with the two arcuate sections of the male half cylinders when joined together to provide a chamber for receiving the distal end of the first pipe segment, the second chamber for accepting the distal end of the second pipe element, and a pair of continuous grooves of angular configuration on each longitudinal edge adapted to associate with the locking engagement with the dovetail male wedge members of the male half cylinder, extending along the entire longitudinal edges of the female half cylinder;

e) shoulder means for re-enforcement of the joining of the first half section to the second half section and for ease and alignment of the male half cylinder with the female half cylinder;

f) fastening and sealing means for fastening the male half cylinder to the female half cylinder and for providing a watertight sealing engagement of said half cylinders to said distal pipe ends comprising adhesive material consisting of plastic, PVC pipe cement for application to the distal ends of the first and second segments of pipe and to the facing surfaces of said split connecting device including the interior surfaces of the first chamber of the split connecting device and to the second chamber of said split connecting device; wherein the male half cylinder is joined to the female half cylinder by manually compressing said male half cylinder and female half cylinder together such that the female continuous grooves engage the dove tailed wedge members to form a tubular split connecting device having a first cylindrical connecting chamber adapted for receiving the distal end of a first pipe segment and a second chamber for accepting the distal end of a second pipe segment such that said distal ends extend into the first and second chambers to abut the transverse mid-ridge of the first and second half section for providing a secure, water-tight connection of the first pipe element to the second pipe element.

* * * * *